US007180932B1

(12) United States Patent
Heinila et al.

(10) Patent No.: US 7,180,932 B1

(45) Date of Patent: Feb. 20, 2007

(54) DATA RATE ESTIMATION IN A COMMUNICATION SYSTEM

(75) Inventors: Marko Heinila, Helsinki (FI); Ulo Parts, Helsinki (FI)

(73) Assignee: Nokia Corporation, Espoo (FI)

(*) Notice: Subject to any disclaimer, the term of this patent is extended or adjusted under 35 U.S.C. 154(b) by 845 days.

(21) Appl. No.: 10/149,150

(22) PCT Filed: Nov. 28, 2000

(86) PCT No.: PCT/EP00/11874

§ 371 (c)(1), (2), (4) Date: Oct. 28, 2002

(87) PCT Pub. No.: WO01/43330

PCT Pub. Date: Jun. 14, 2001

(30) Foreign Application Priority Data

Dec. 10, 1999 (GB) ................................ 9929373.0

(51) Int. Cl.
*H04B 1/69* (2006.01)
*H04B 1/707* (2006.01)
*H04B 1/713* (2006.01)

(52) U.S. Cl. ...................................................... 375/147

(58) Field of Classification Search ................. 375/147
See application file for complete search history.

(56) References Cited

U.S. PATENT DOCUMENTS 5,978,428 A 11/1999 Hayashi ...................... 375/377

FOREIGN PATENT DOCUMENTS

EP 0 913 971 A2 5/1999

OTHER PUBLICATIONS

Sheung C N et al: "Rate determination algorithms in IS-95 forward traffic channels" IEEE Vehicular Technology Conference, May 18, 1998, XP002096679 p. 2188.

Kwon K M et al: "One Viterbi Decoder with Data Rate Estimation for IS-95 Wireless Communication" Global Telecommunications Conference (GLOBECOM), US, New York, IEEE, Nov. 3, 1997, pp. 594-598, XP000737608.

*Primary Examiner*—Chieh M. Fan
*Assistant Examiner*—Jia Lu
(74) *Attorney, Agent, or Firm*—Harrington & Smith, PC

(57) ABSTRACT

The present invention relates to a method and a circuitry for estimating a spreading factor and/or data transmission rate in a communication system that employs variable data transmission rates. A received transmission signal is analyzed in order to estimate noise variances for those spreading factors that are possible for a data frame in the signal. The estimate is based on information that is determined by assuming that the smallest possible spreading factor was used for the transmission of the signal. The estimates are then scaled by predefined constants, each of the constants depending on the respective possible spreading factor. The smallest one of the scaled estimates is determined, whereafter the most probable spreading factor of the received data frame is determined based on the smallest variance estimate.

38 Claims, 12 Drawing Sheets

30
RF
28
CODE GEN.
22
A/D
32
SYNC. UNIT/
IMP. RESP.
MEASUREMENT
34
DESPREAD + CHANNEL
ESTIMATION
36a
36b
PRECOMBINER
SMALLEST SF
38
RATE
ESTIMATOR
40
FINAL DESPREAD
42
CHANNEL DECODING ETC.
44

```
*/

#define MaxLog2K (6)
#define MaxK (1<<MaxLog2K)
#define Nsample (16*10*MaxK)
#define Nblock (1*10*MaxK)
#define Alpha (2.8)

int
rate_detection (float r[Nsample])
{
  float sum[Nsample], abs_sum[MaxLog2K+1], sqr_sum,  p[MaxLog2K+1], min;
  int i0, i, j, k, nk;

  for (i=0; i<=MaxLog2K; i++)
    p[i] = 0;
  for (i0=0; i0<Nsample; i0+=Nblock)
    {
      for (i=i0; i<i0+Nblock; i+=MaxK)
              {
                for (j=0; j<MaxK/2; j++)
                  sum[i+j] = r[i+2*j] + r[i+2*j+1];
                for (; j<MaxK; j++)
                  sum[i+j] = sum[i +2*j-MaxK] + sum[i +2*j+1-MaxK];
              }
      sqr_sum = 0;
      for (j=0; j<=MaxLog2K; j++)
              abs_sum[j] = 0;
      for (i=i0; i<i0+Nblock; i+=MaxK)
              {
                for (k=0; k<MaxK; k++)
                  {
                    abs_sum[0] += fabs (r[i+k]);
                    sqr_sum += r[i+k] * r[i+k];
                  }
                for (j=1; j<=MaxLog2K; j++)
                  for (nk=(1<<(MaxLog2K-j)), k=0; k<nk; k++)
                    abs_sum[j] += fabs (sum[i+MaxK-2*nk+k]);
              }
      sqr_sum *= Nblock;
      for (i=0; i<=MaxLog2K; i++)
              p[i] += (sqr_sum - abs_sum[i] * abs_sum[i])
                * pow (Alpha, 1.0/(1<<(i)));
    }
  min = p[j=0];
  for (i=1; i<=MaxLog2K; i++)
    if (p[i] < min) { min = p[i]; j = i; }
  return 1<<(j+2);
}
```

Fig. 5

Figure : Spreading factor SF=4.

Figure : Spreading factor SF=8.

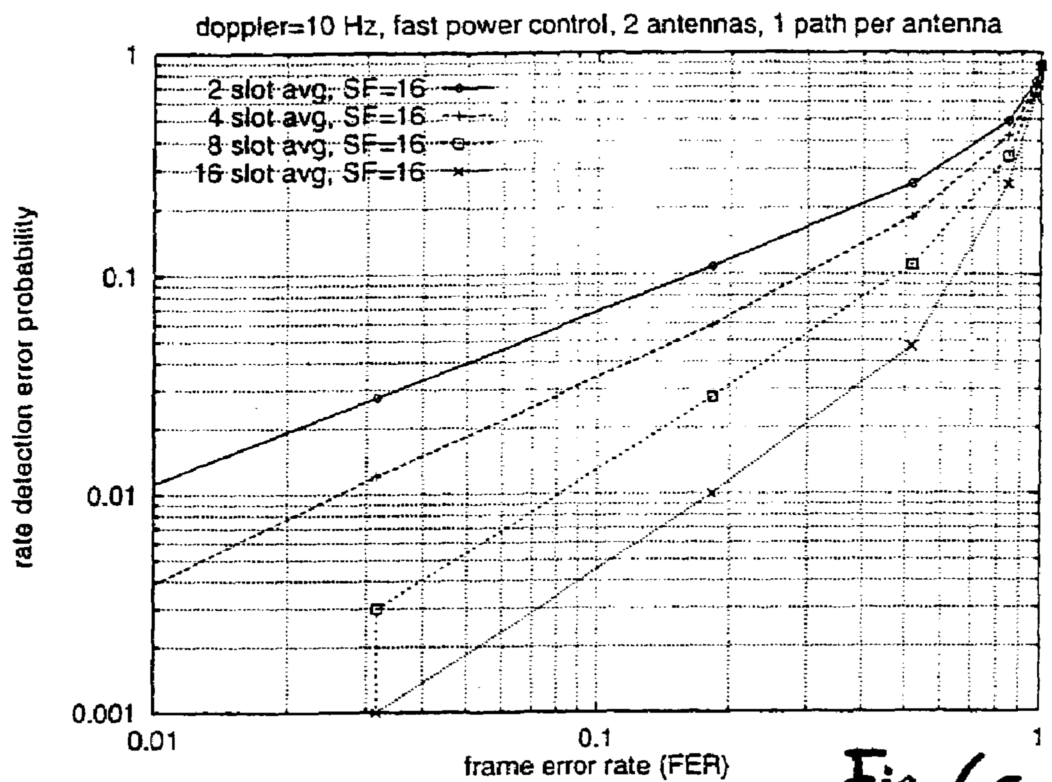
Figure : Spreading factor SF=16.
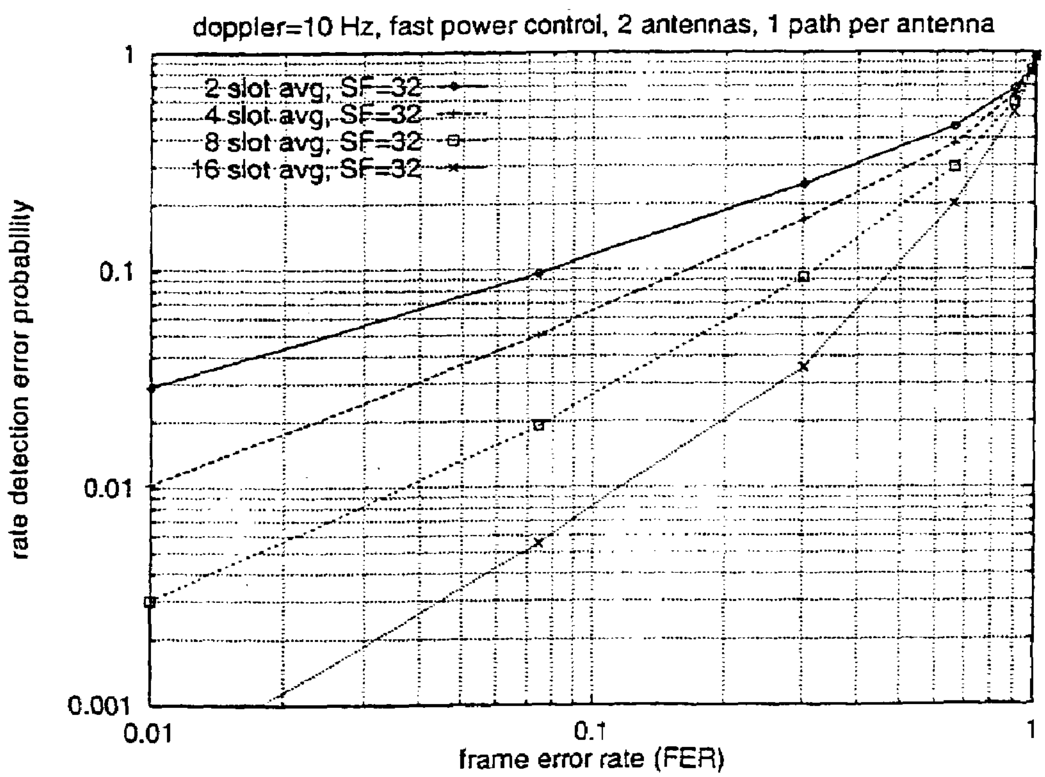
Figure : Spreading factor SF=32.
Fig. 6d Figure : Spreading factor SF=64.

Figure : Spreading factor SF=128.

Figure : Spreading factor SF=256.

Figure : Spreading factor SF=4.

Figure : Spreading factor SF=8.

Figure : Spreading factor SF=16.

Figure : Spreading factor SF=32.

Figure : Spreading factor SF=64.

Figure : Spreading factor SF=128.

Figure : Spreading factor SF=256.

DATA RATE ESTIMATION IN A COMMUNICATION SYSTEM

PRIORITY CLAIM

This is a U.S. national stage of PCT application No. PCT/EP00/11874, filed on 28 Nov. 2000. Priority is claimed on that application and on Application No.: 9929373.0, filed in Great Britain on 10 Dec. 1999.

FIELD OF THE INVENTION

The present invention relates to a method and circuitry for estimating spreading factors and/or data rates of signals transmitted in a communication system, and more particularly, but not explicitly, between stations in a cellular code division multiple access (CDMA) or any analogous communication system.

BACKGROUND OF THE INVENTION

In a communication system data is transmitted as a plurality of data symbols in subsequent data frames. The signals carrying the data may be transmitted with variable data transmission rates (data speeds), wherein the transmission rate may be different in subsequent frames of the transmission. For example, in a cellular CDMA (Code Division Multiple Access) system data is encoded for transmission by processing data symbols to be transmitted by a spreading code and a unique scrambling code for each transmission channel. The length of the spreading code (i.e. the number of "chips" per a data symbol) is defined by a spreading factor. The effect of a spreading code is to spread the frequency band of a transmission to a chip rate which is larger than the actual information bit rate. This results that more symbols or bits are transmitted than what the actual number of information symbols or bits is. For example, if the used spreading factor is eight, eighth bits (referred to as "chips") are transmitted for every information bit. The scrambling code is unique for each mobile station transmitting to a single base station so that the transmission from individual mobile stations can be distinguished at the base station. The spreading codes as well as the scrambling codes are preferably as far as possible orthogonal to allow for a plurality of different mobile stations to communicate with a base station on selectively coded channels.

For example, it is thus possible to set up such a variable-rate (multi-rate) connection where the data rate of the information bits, and thus the spreading code used in the spreading modulation of these bits, varies from radio frame to radio frame (e.g. every 10 ms). The data rates used in such a connection are not arbitrary, but for each radio frame duration, one of the plurality of pre-defined data rates is used. Moreover, every higher data rate is dividable by a lower data rate, the division factor being $2^k$ for $k \geqq 0$. Although this specification presents an example employing variable-rate connection spreading factors 4, 8, 16, 32, 64, 128 and 256 and corresponding data rates, it is evident that also other spreading factors and data rates could be used without departing from the basic concept of the variable data rate (or multi-rate) transmission. To give an example, in a CDMA with a chip rate of 4.096 MHz the relation between the spreading factors (SF) and the data rates is such that spreading factors 4, 8, 16, 32, 64, 128 and 256 correspond data rates 1024, 512, 256, 128, 64, 32 and 16 kbps, respectively. However, if the chip rate frequency changes, the relation between the spreading factors and data rates will change accordingly.

When a signal is transmitted between a base station and a mobile station (either on the uplink or the downlink) of a CDMA system, the receiving station needs to establish from the received signal some information about the communication path along which the signal has travelled. This procedure is referred to herein as "channel estimation". The channel estimation is typically carried out in a channel estimation unit. Various techniques are known for channel estimation. A channel impulse response generated by the estimation unit is required in order to properly decode and process incoming data.

The spreading factor and/or the corresponding data transmission rate of the received signal can be used in the channel estimation. However, if the spreading factor and/or data rate of a received radio frame is not directly available at the receiving station, the correct data rate has to be determined by some means, e.g. by trying several possible data spreading factors for the transmission. For example, in the CDMA the information symbols in said radio frame are usually obtained by means of detecting the complex data symbols assuming that the highest-possible data rate is used for transmission, and using the lowest-possible spreading factor in the receiving station. The shortest possible spreading code (e.g. with spreading factor SF=4) has to be known so that all the other codes can be constructed from the shortest code by multiplying the shortest code by an integer. In practice, if the code length i.e. the spreading factor is not known, the receiver unit must perform the first despreading based on an assumption that the shortest possible code (minimal SF) was used for the transmission. For example, assuming that the data rate of the received radio frame was 1024 kbps in the first place, this corresponds to the spreading factor of 4 (at 4.096 Mcps) used in the detection of the data symbols. The result of this detection should be a data vector of all detected complex information symbols corresponding to the received radio frame.

However, after a MRC (maximal ratio combination) a correct spreading factor has to be used, otherwise the received data cannot be properly represented or used otherwise decoded and/or will be lost. Therefore the above assumption of the data rate is not enough, but it has to be estimated what was the actual data rate of the signal at the transmitting station during the transmission. For example, as the basic assumption may be incorrect, this stage might give a decision that instead of the assumed and initially used 1024 kbps (with spreading factor 4 and frequency 4.096 MHz) the actual data rate in the received radio frame was 256 kbps (corresponding to the spreading factor of 16). After the estimation of the correct data rate, as many adjacent symbols as is indicated by the spreading factor are summed together to get one actual information symbol. In the above example, this would lead to summing up every four adjacent symbols to get one actual information symbol (4×4=16). Therefore it would be advantageous to be able to have information of the actual data rate and/or spreading factor of the transmission already at the time of the detection of the signal at the receiver circuitry.

The transmission between the stations may or may not include explicit information of the spreading factors and/or data rates of the transmitted signal. In the first case, i.e. if the variable-rate connection includes explicit information on the used data rates for each received radio frame, this information is usually given in a separate channel, for example in an DPCCH (Dedicated Physical Control Channel). However, this information is often encoded in such a way that the actual data rate of the received radio frame is not known at the time the data symbols of the radio frame are detected. In addition, it may be necessary in some applications to be able to establish another estimate of the data rate, for example for the purposes of verification and/or correction of the received date rate information. In the latter case, i.e. if the explicit information is not included in the received signal, so called unknown or blind data rate estimation may be used at the receiving station in order to define at the receiver the actual data rate of the received signal.

Therefore a mechanism is needed for estimating the data rate or spreading factor in a receiving station (e.g. a base station or a mobile station). This estimate may be desirable e.g. when this information is not available, or when an early estimate of the data rate is required before decoding, or when a confirmation of data rate information received from the transmitting station is desired.

One prior art proposal for detecting the data rate of the received signal before decoding is based on the power difference of the received bits in the data channel and the control channel (i.e. the power ratio between the data and control channels). The method is relatively simple as it requires only the average power estimates of the received control symbols and data symbols. However, the disadvantage of the power ratio method is that it is not very accurate and/or reliable. Especially, if a low spreading factor is used in detecting the data symbols (SF=4 in the above example) in the first place, noise becomes very dominant in the detection process. This degrades substantially the performance of the data symbol power estimation.

Another prior art method is based on CRC (Cyclic Redundancy Check: an error detection signal) decoding of the received signal. In here a convolutional code or any other appropriate code (e.g. so called turbo code that is typically applied for high-speed data transmission) is decoded for each possible spreading factor and a CRC check is accomplished for the results. If a correct CRC is detected, a correct data rate has been found. In other words, the method is based on a data rate assumption at each decoding stage and a subsequent selection of a data rate which gives either a correct or an incorrect CRC word. To give an example, assuming again that the possible data rates are 32, 64, 128, 256, 512, and 1024 kbps, a CRC check would be calculated directly for the information symbols of the received radio frame by assuming firstly a data rate of 1024 kbps. The resulting CRC word is stored. Two adjacent received symbols are summed together, assuming a data rate of 512 kbps, and a further CRC check is calculated for these information symbols. The resulting CRC word is stored. The process continues summing two adjacent information symbols together and calculating CRC checks for all these information streams until a lowest-possible data rate is achieved. Thereafter the stored CRC words are verified and such a data rate is selected that corresponds the rate used in the transmitter when a right CRC check was obtained (if such existed at all).

However, the CRC method is computationally complex and involves a substantially large amount of processing since the convolutional code or similar must be decoded for each possible frame length. If there are N possible data rates, this requires N consequent CRC decoding processes before a decision of the transmitter data rate can be made. In addition, the spreading factor detector based on the CRC has to be located after decoding, and the data rate for a frame can be calculated only after the entire radio frame has been received. Thus this method cannot be used e.g. when the spreading factor has to be known all the time during the receiving process, and the CRC check may not be applied in applications where the data rate information has to be available before the entire radio frame has been received. The above method delays the final decision of the data rate of the received signal to a stage where at least some decoding of the data is needed for the first time. This will make the operation difficult for receiver structures that require an estimate of the data transmission rates of the received signals at an earlier stage than the first decoding. One such receiver comprises an Interference Cancellation (IC) receiver. Moreover, the method does not give any data rate at all if the algorithm does not give an exactly matching CRC check.

SUMMARY OF THE INVENTION

It is an aim of the embodiments of the present invention to address one or several of the disadvantages of the prior art and/or to provide a new type of solution for spreading factor and/or data rate estimation.

According to an aspect of the present invention there is provided a method in a communication system with variable data transmission rates, wherein a transmitted signal includes a plurality of data symbols in one or several data frames, the data symbols being spread in each of the data frames in a manner defined by a respective spreading factor, comprising:

receiving the signal;

estimating noise variances for the spreading factors that are possible for a data frame in the signal based on information that is determined by assuming that the smallest possible spreading factor was used for the transmission of the data frame;

scaling the estimated noise variances by predefined constants, each of the constants depending on the respective possible spreading factor;

determining the one of the scaled noise variance estimates that has the smallest value; and estimating the most probable spreading factor of the received data frame based on the determined smallest scaled noise variance estimate.

According to another aspect of the present invention there is provided a signal receiving circuitry for use in a communication system with variable data transmission rates wherein data is transmitted as a plurality of data symbols spread over one or several data frames, the spreading of the data symbols within each of the data frames being defined by a respective spreading factor, the signal receiving circuitry comprising processor means for estimating noise variances for the data spreading factors that are possible for a data frame, wherein the estimate is based on information of the signal that is determined by assuming that the spreading factor used for the transmission of the data frame is the smallest spreading factor possible for the transmission of the data frame, for scaling the estimated noise variances by predefined constants, each of the constants depending on the respective possible spreading factor, for determining the one of the scaled variance estimates that has the smallest value, and for estimating the most probable spreading factor of the received data frame based on the determination of the smallest scaled variance estimate.

The embodiments of the present invention provide several advantages. The embodiments of the invention may be applied to provide a spreading factor or data rate estimate when no rate information is transmitted. In addition, the embodiments of the invention may be applied when the rate information is transmitted but cannot, for reason or another, be used or detected from the signal during the receiving process. One possible use of the embodiments is to provide an additional data rate information which can be used e.g. for correction or error check of a rate information detected from the transmitted signal. The estimate of data transmission rate can also be used in other parts of the received signal processing sequence, e.g. in an IC receiver. The possibility for an early detection of the unknown data rate may enable use of any such receiver structure which makes use of the data rate information at an early stage. The estimate can also be used to assist in rate selection for applications such as Viterbi decoding of the incoming data symbols, or to assist in decision of an alternative transmission rate for decoding if an error check fails. In addition, embodiments of the invention may provide a data rate detection that is not too sensitive to SNR (Signal-to-Noise Ratio) fluctuation. The embodiment may also provide a less complex detection structure and computations than the prior art proposals.

BRIEF DESCRIPTION OF DRAWINGS

For a better understanding of the invention and to show how the same may be carried into effect reference will now be made by way of example to the accompanying drawings in which:

FIG. 5 shows an exemplifying embodiment as a C-language program code;

FIGS. 6*a* to 6*g* show simulation results obtained with different spreading factors as a probability of rate detection error relative to frame error rate.

DESCRIPTION OF PREFERRED EMBODIMENTS OF THE INVENTION

Figure 1:
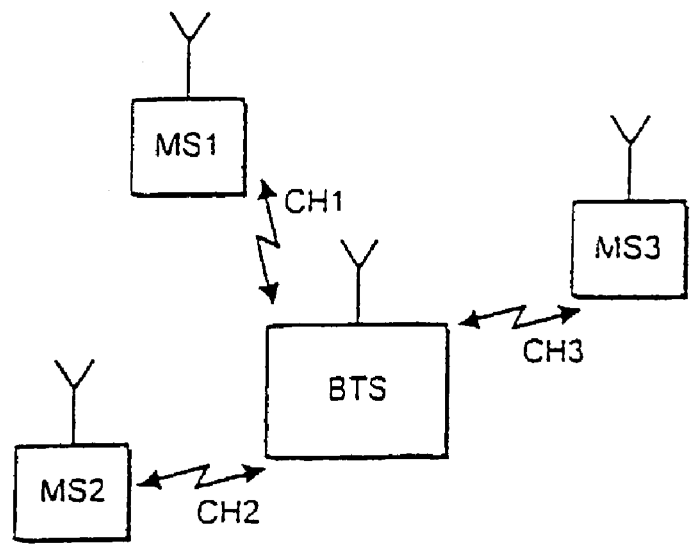
FIG. 1 is a block diagram of a mobile communication system.
Figure 2:
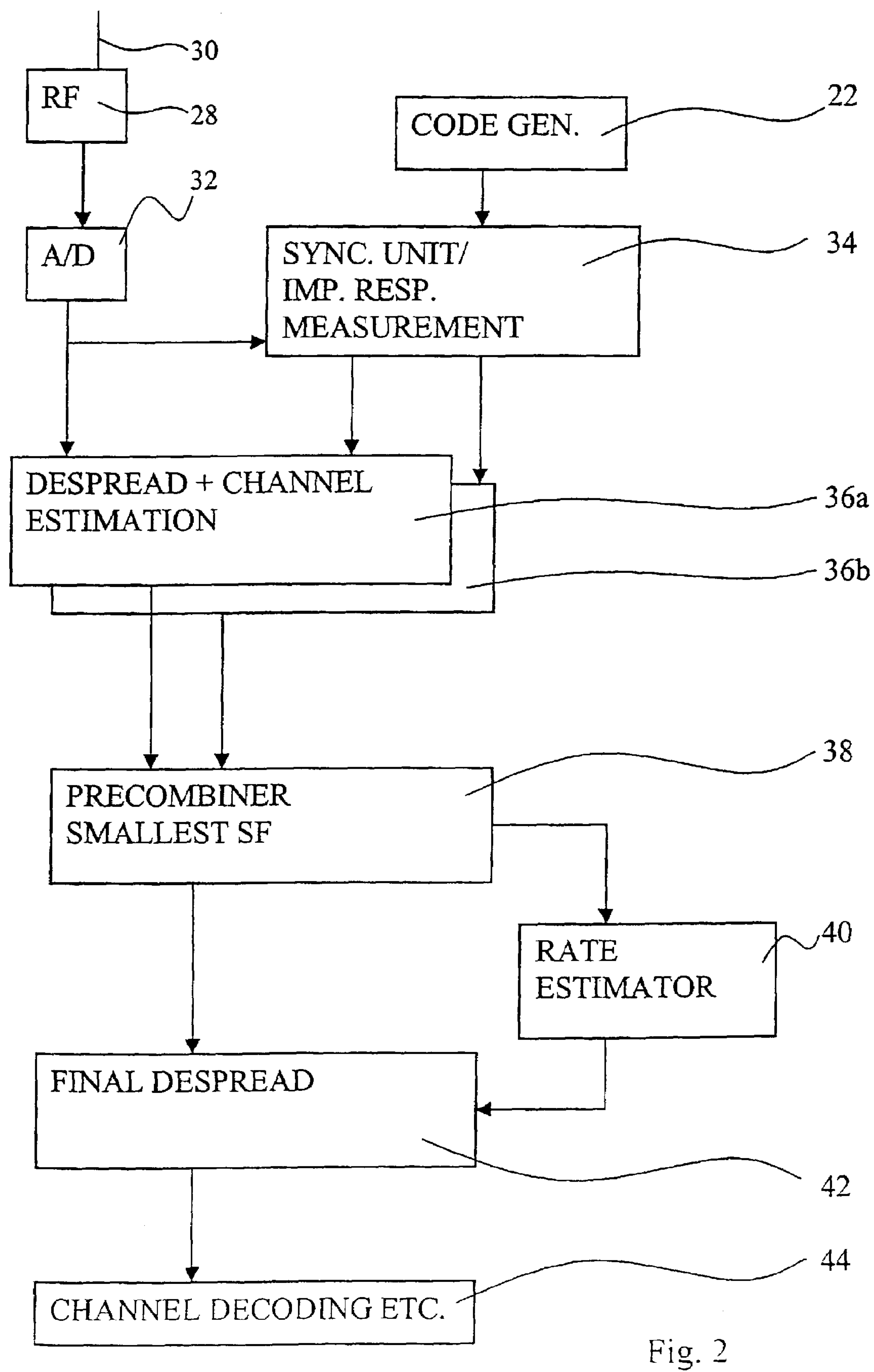
FIG. 2 illustrates a reception circuitry in a station.

FIG. 1 is a block diagram illustrating a context in which the present invention may be used. That is, a CDMA mobile communication system that allows a plurality of mobile stations MS1, MS2, MS3 to communicate with a base (transceiver) station BTS in a common cell via respective channels CH1, CH2, CH3. These channels are distinguished from one another by the use of scrambling codes in a manner which is known in the art. FIG. 2 is a block diagram of a receive circuitry at a base station in a WCDMA system (Wideband CDMA). The receive circuitry of FIG. 2 is for use in uplink direction, i.e. for receiving signals from the mobile stations (MS). It is noted that even though the receive circuitry implementation in the downlink direction, i.e. at the mobile station, may be somewhat different, the invention is analogously applicable to the downlink and the mobile stations as well.

Before describing the exemplifying receiving circuitry of FIG. 2 that employs an embodiment of the invention, a transmit circuitry (not shown) within a transmitting station will be briefly described. Data to be transmitted between a mobile station (MS) and a base transceiver station (BTS) may be speech data, video data or other data. The data is encoded into a form suitable for transmission at a bit rate which is dependent on the source of the data. The encoded user data is typically supplied to a frame multiplexer. In some embodiments the user data may also be supplied to a CRC encoder which generates a check sequence (CRC) for each frame of data. Error correction coding and bit interleaving of the frame sequence can be accomplished prior to transmission in a manner known in the art. The error correction is used in order to protect the user data from errors in a radio channel so that e.g. a Viterbi decoder can recover the coded data even if some of the bits are corrupted. For error coding and decoding purposes, tail bits defining the end of each user data sequence may also be added to the end of user data sequence. Bit interleaving spreads burst errors which typically occur in radio channels more evenly in time to allow the decoder to more efficiently correct the errors from the coded data.

Figure 3:
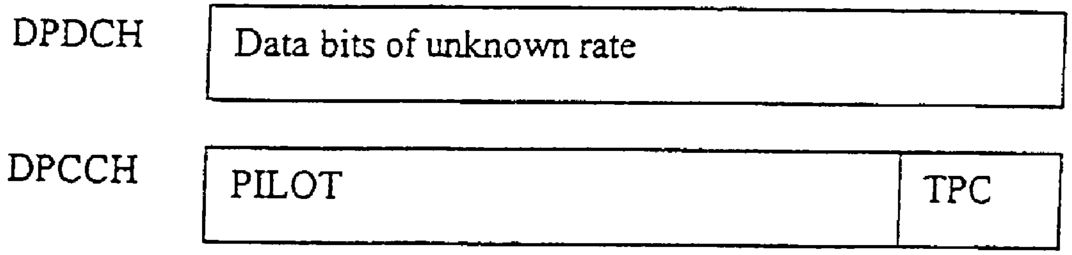
FIG. 3 illustrates a slot structure for physical channels for a transmission with unknown data rate.

A frame multiplexer organises the data for transmission into a frame sequence. FIG. 3 illustrates an example of a slot structure for physical channels DPCCH (Dedicated Physical Control Channel) and DPDCH (Dedicated Physical Data Channel) in the frame sequence. The DPCCH part of the frame contains a pilot sequence (PILOT), a possible but not necessary rate information (RI) sequence (not shown) and a transmission power control (TPC) sequence. The DPDCH part of the frame contains the whole interleaved user data sequence (user bits and possible CRC bits and possible tail bits). Typically, the user data of the DPDCH is divided into frame periods, such as periods of 10 milliseconds each. Each frame can be transmitted with a different rate. Thus, the transmitter is enabled to multiplex data from different sources into the frame sequence for transmission and to provide different transmission rates in different frames of the frame sequence. In the following exemplifying embodiments the data rate detection at the receiver is subjected to the DPDCH sequence of the frame.

The frame sequence is supplied to a spreader which receives spreading and scrambling codes from a code generator. The spreading and scrambling codes are known and may be generated in accordance with known CDMA techniques and will thus not be described further herein. The effect of the spreading code is to spread the frequency band for transmission to a chip rate which is larger than the bit rate. As explained, the scrambling code is unique for each mobile station transmitting to a single base station so that the transmission from individual mobile stations can be distinguished at the base station. If M parallel code channels are employed, M data symbols are spread using different spreading codes and then the results are summed together. The spread signal is then typically supplied to a modulator which modulates the signal ready for transmission, for example according to QPSK modulation. In some systems, modulation may be carried out prior to spreading. This sequence of events, however, has no impact on the present invention. The spread, modulated signal is then be supplied to a digital to analogue (D/A) converter and further to an RF (radio frequency) unit which supplies the spread signal ready for transmission.

The present invention relates to the reception side of the connection. The reception of the spread signal will now be described with reference to FIG. 2. As is shown, signals incoming at an antenna 30 are received by an RF unit 28 and supplied to an analogue to digital (A/D) converter 32. It will readily be understood that a signal may arrive at the receiving station having experienced multipaths with differing propagation delays. Samples or a portion of the digital signal may be provided to a synchronisation unit 34 and/or to a impulse response measurement unit. The synchronisation unit 34 handles the synchronisation between the mobile station and the base station BTS after power has been turned on as well as in a handover case. The synchronisation procedure includes searching for signals which have been transmitted with a scrambling code that is unique for that particular transmitting station. The synchronisation unit 34 receives the unique code from a code generator 22. To perform the search function, the synchronisation unit correlates the unique code with the incoming signal until a strong correlation is detected. After the synchronisation procedure is completed, a dedicated traffic channel can be established between the transmitting and receiving stations.

The digital signal is provided also to one or more despreading and channel estimation units 36*a*, 36*b*. More than two units may be employed, and the required number of the units 36*a*, 36*b* depends on the radio propagation environment and/or the communication application. The despreading is based on assumption that the spreading employed for the transmission is the smallest possible spreading factor. The channel phase estimate by the unit 36*a* and/or 36*b* is typically needed for combining and demodulation of the received data symbols.

Precombiner 38 is arranged to combine the data symbols received from the despread and channel estimation unit 36*a* and/or 36*b*. The signal from despreader 36*a* may be assumed to be the strongest signal (i.e. a signal that came in along the primary path). It is also possible to supply information from a plurality of the despreader units to the precombiner. The data symbols received from the unit 36*a* and/or unit 36*b* are combined i.e. summed in order to provide soft data symbols.

The circuitry comprises also a rate estimator 40 for providing data rate estimate for the further processing of the received signal. The estimator 40 may be implemented, for example, by using a digital signal processor (DSP) or several DSPs. An advantage of the DSPs is that they enable a flexible implementation of the estimation unit. An alternative is to implement the estimator by means of an application specified integrated circuit (ASIC) or several ASICs. However, it is to be appreciated that also other types of processing arrangements are possible. The general architecture of the processing functionality may also vary, and it is possible to distribute the various functions required in the estimation to several separate and/or different processing units, as may be appropriate.

An estimate of the data rate is needed from the rate estimator 40 in order to be able to decide how many successful data symbols are to be summed together. The operation of the unit 40 will be discussed in more detail below when explaining possible methods for the data rate estimation embodiments.

After the determination of the data rate it is possible to accomplish a final despreading of the signal at despreader 42. The completely despread signal may then be subjected to further processing, such as channel decoding at a channel decoder 44 and so on.

It is noted that several alternative circuit structures to the embodiment shown in FIG. 2 are possible to implement the embodiments of the present invention.

As already briefly mentioned above, the circuit is provided with a rate estimator unit 40 that is arranged to receive information of the signal from the precombiner 38. In a preferred embodiment the information comprises soft symbols that are derived from the signal.

Figure 4:
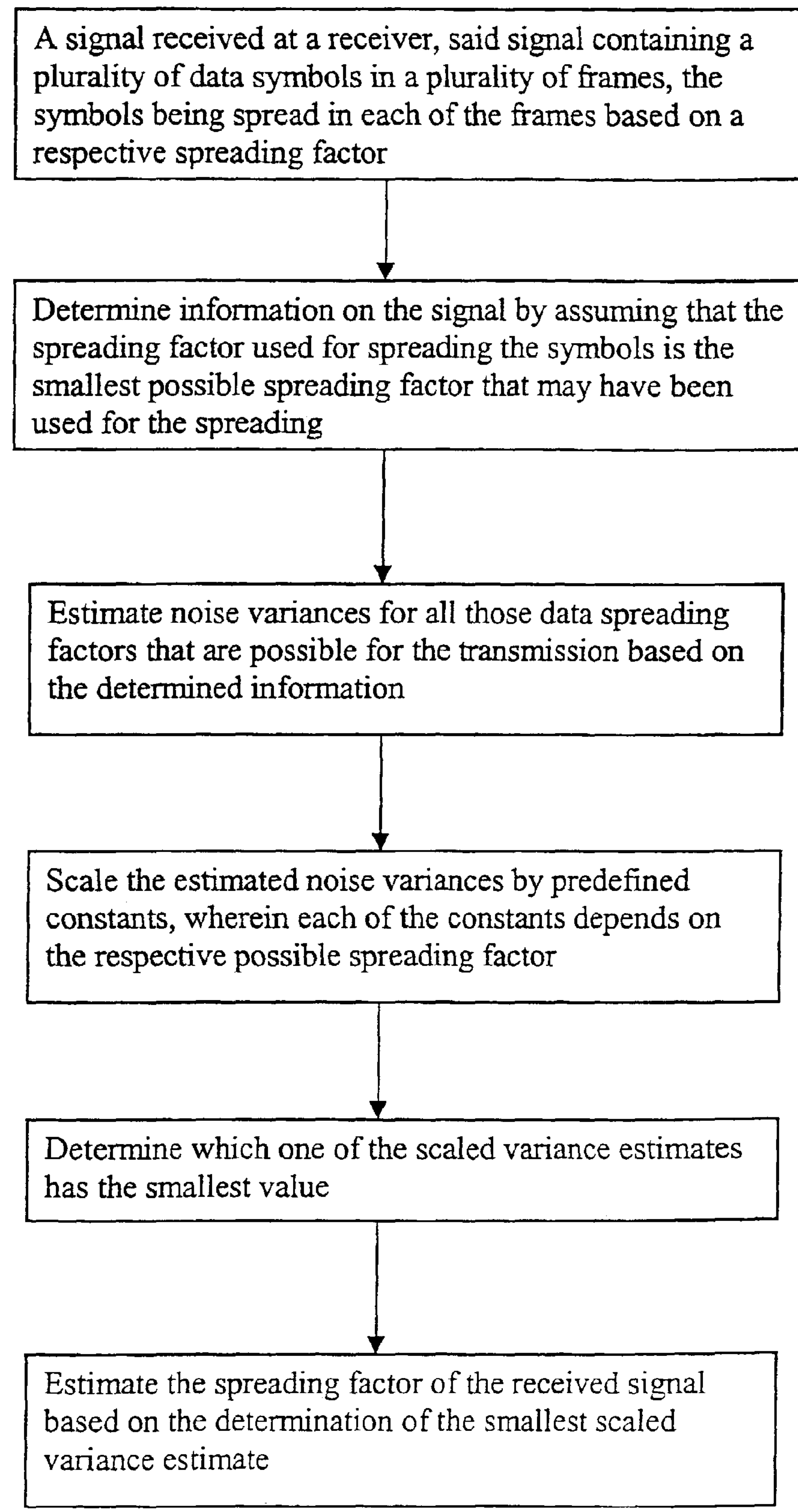
FIG. 4 is a flow chart for a blind rate classification according to one embodiment of the invention.

The following will describe, with reference to FIG. 4, an embodiment for estimating the spreading factor and thus transmission data rate of subsequent frames by estimating the data rate directly from soft data symbols derived from the received signal and provided to a data rate estimator.

In the mechanism described in the following an estimator of a receiver assumes that a smallest possible spreading factor of the plurality of possible spreading factors (and thus the largest possible data rate) is used from the transmission. By means of this basic assumption it is possible to avoid the need for several subsequent or parallel decoding attempts. A noise variance is estimated for each possible spreading factor. The estimate is preferably estimated by processing further soft bits which were initially calculated based on the above assumption of the largest possible data rate (smallest possible spreading factor). In the embodiments of the invention the resultant noise variances for different spreading factors are scaled by appropriate constants which each depend on the respective spreading factor. The results of the computations are examined in order to define a scaled noise variance of the plurality of scaled noise variances that has the smallest value. The inventors have found that the most probable spreading factor, and hence the data rate, of the received signal can be determined based on the information of the smallest scaled noise variance estimate value. More precisely, it has been found that the most probable spreading factor associates with the scaled noise variance that has the smallest value.

The noise variance estimation can be based on simple methods, as will be discussed below. Suitable scaling constants may also be easily defined such that the embodiments may work if a fading channel with fast transmission power control is used.

The rate detection algorithm may be based on processing of soft data bit samples $r_I$ obtained for the smallest possible spreading factor $S_0$. Generally speaking, a maximal ratio combined (MRC) soft data symbol can be expressed as:

$$r_i = d_m A + \eta_i, \tag{1}$$

where $d_m$ is a data symbol (e.g. ±1), A represents signal amplitude and $\eta_i$ represents gaussian noise with variance σ2. The probability distribution of $r_i$ is then given by:

$$P(r_i \mid d_m = \pm 1, A, \sigma) = \frac{1}{\sqrt{2\pi\sigma^2}} e^{-(r_i - d_m A)^2/2\sigma^2}. \tag{2}$$

In order to solve the probability of the spreading factor S it is possible to write:

$$P(\{r_i\},S) = P(\{r_i\}|S)P(S) = P(S|\{r_i\})P(\{r_i\}) \tag{3}$$

so that the Bayes rule may be obtained for the probability of S that is conditioned on the received samples $\{r_i\}$:

$$P(S|\{r_i\}) = P(\{r_i\}|S)P(S)/P(\{r_i\}) \tag{4}$$

where $$P(\{r_i\}) = \sum_{s} P(\{r_i\} \mid S)P(S) \tag{5}$$

$$P(\{r_i\}|S) = \int dA \int d\sigma P(\{r_i\}|A, \sigma, S)P(A, \sigma|S) \tag{6}$$

$$P(\{r_i\} \mid A, \sigma, S) = \prod_{m=0}^{M-1} \left\{ \frac{1}{2} \sum_{d_m = \pm 1} \prod_{k=0}^{K-1} P(r_{Km+k} \mid d_m, A, \sigma) \right\}. \tag{7}$$

The maximum value of the equation (4) as a function of S will describe the most probable spreading factor. Thus equation (4) may be used directly for determining the spreading factor. However, even though the operation of the rate estimator may be based on the above equation (4), this may not be the most straightforward and easiest approach for all practical applications. The following will this discuss a preferred embodiment for the data rate estimation.

Even though the signal amplitude A and the noise variance may depend to some extent of the spreading factor, the inventors have found that in order to simplify the spreading factor detection procedure it is possible to avoid any need of having any a priori knowledge of the actual amplitude A or variance σ, as will be demonstrated below. The requirement of the a priori knowledge may be avoided and the equitation (4) may be simplified if it is assumed that the data amplitude remains constant.

In the following equation the sample index i has been assumed to have the values i=0, . . . , $N_S$ N−1, where $N_S$ is the number of time slots and N designates the number of samples per one time slot. For example, in WCDMA it is possible to have N=640 when $S_0$=4. As explained above, all possible spreading factors can be defined by multiplying the smallest possible spreading factor $S_0$, i.e. $S=KS_0$, wherein K value presents an integer indicating the division factor $2^K$ for K≧0. In other words, $K=S/S_0$.

For each time slot j=0, . . . , $N_S-1$, a noise variance estimate for all possible spreading factors may be calculated by:

$$\sigma_j^2(K) = \left\{ \frac{1}{N} \sum_{i=0}^{N-1} r_{jN+i}^2 - \left( \frac{1}{N} \sum_{m=0}^{M-1} \left| \sum_{k=0}^{K-1} r_{jN+mK+k} \right| \right)^2 \right\} \tag{8}$$

In the above equation the quantity M=N/K, i.e. M is the number of symbols per time slot for the spreading factor $S=KS_0$. The noise variances are calculated separately for each time slot because the power control of the communication system changes the amplitude in each slot, and thus the amplitude may not remain the same in the successive slots.

Noise variance estimates may then be averaged over $N_S$ successive time slots:

$$\sigma_{avg}^2(K) = \frac{1}{N_S} \sum_{j=0}^{N_S-1} \sigma_j^2(K) \tag{9}$$

The averaging is not required in all applications. For example, the averaging may not be required in applications which do not employ power control or in applications which do not present any substantial fading. The averaging is, however, preferred as it improves the reliability of the results obtainable by the embodiments. The reliability is improved since it is possible to shorten the length of the time slots by means of the averaging.

Finally, the most probable data speed can be obtained by determining the smallest of the scaled averages of the variance estimates $$\alpha^{1/K} \sigma_{avg}^{\ 2}(K) \tag{10}$$

over the possible K values. The quantity of the term α may be selected by minimizing detection error rate. Good scaling factors for different data speeds have been found to be given when the constant α in the term $$\alpha^{1/K} \tag{11}$$

has the value α=2.8. The proposed value α=2.8 was found to give good results in simulations that will be discussed below. Consequently, good performance is obtained if the scaling constants for the K values K=1, 2, 4, 8, 16, 32, and 64 are proportional to 2.8, 1.673, 1.294, 1.137, 1.0665, 1.0327, and 1.0162, respectively, with the chip frequency 4.096 MHz.

An exemplifying C-language floating-point implementation of the above embodiment is shown in FIG. 5. In the example the function int_detection (float r[Nsample]) returns the most probable spreading factor. The input vector r[Nsample] contains the samples for the smallest spreading factor (SF=4 in the example). Nsample is the number of samples for the smallest spreading factor. In the example of FIG. 5 the averaging was done over one frame, so Nsample=16*10*256/4. Nblock is the processing block length of the variance estimation. The example is based on a further assumption that one block is used for the entire block length, so Nblock=10*256/4. MaxK is the largest SF divided by the smallest SF, i.e. MaxK=256/4=2**6=64. MaxLog2K is the base 2 logarithm of the MaxK, i.e. MaxLog2K=6.

The above discussed data rate detection algorithm has also been tested by simulating with realistic signals. The test signals were produced assuming fading radio channel, realistic channel estimation, and fast transmission power control. Two antennas and one propagation path per antenna were also assumed to be employed by the simulated implementation. The fading radio channel was modeled with a Jakes type Doppler spectrum. Doppler frequency of 10 Hz was used. Conventional ⅓-rate K=9 convolutional code was used as the channel code. The length of the radio frame was 10 ms in all simulations. Channel interleaving was carried out with a simple matrix interleaver over 16 WCDMA time slots. The channel estimation method was based on simple sliding average over 2 subsequent time slots. Pilot channel amplitudes were given by G times data amplitude, where the G factor was 0.25, 0.28, 0.31, 0.36, 0.44, 0.54, 0.69 for spreading factors 4, 8, 16, 32, 64, 128, and 256, respectively.

In the simulations the rate detection was used to estimate the correct spreading factor SF amongst 7 different possibilities. The possible SF values were 4, 8, 16, 32, 64, 128, and 256. All spreading factors SF were assumed to have the same a priori probability, i.e. all SF values were equally likely to occur.

The probability of an incorrect data rate decision was estimated by using different averaging lengths from 2 to 16 WCDMA time slots, i.e. the averaging time used for the computations was from 1.25 ms to 10 ms. In FIGS. 6*a* to 6*g* the probability of an incorrect data rate estimate is plotted as a function of frame error rate (FER). In order to facilitate comparisons with other simulations and data rate detection methods, the same results are also shown in FIGS. 7*a* to 7*g* as a function of bit error rate (BER) without employing any convolutional code.

Figure 6A:
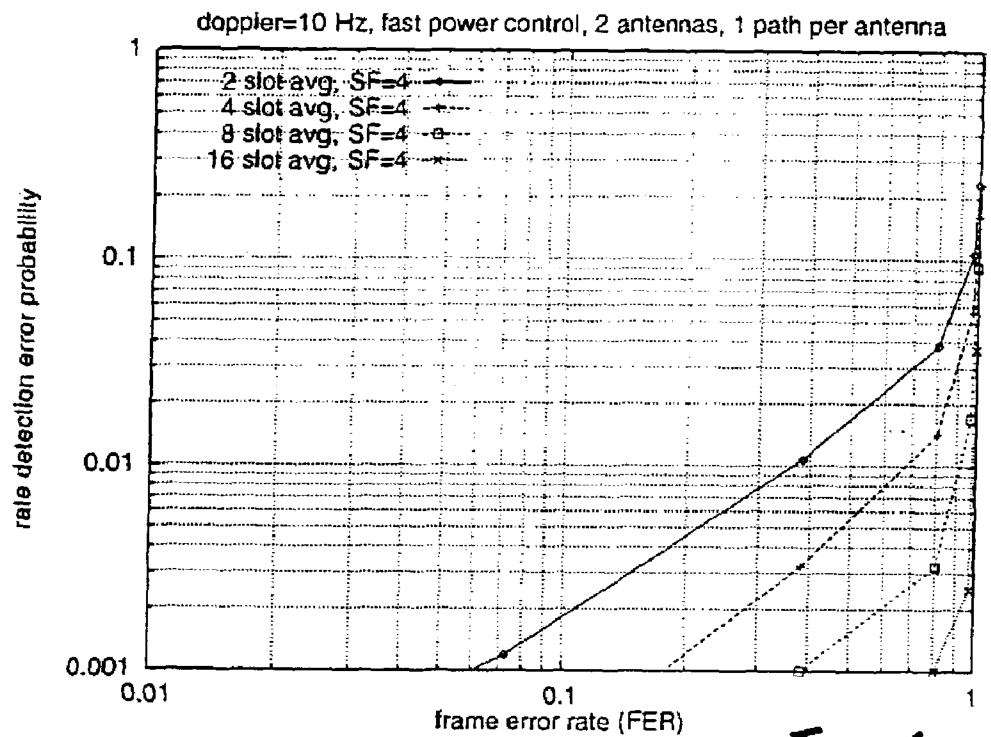
Figure 6B:
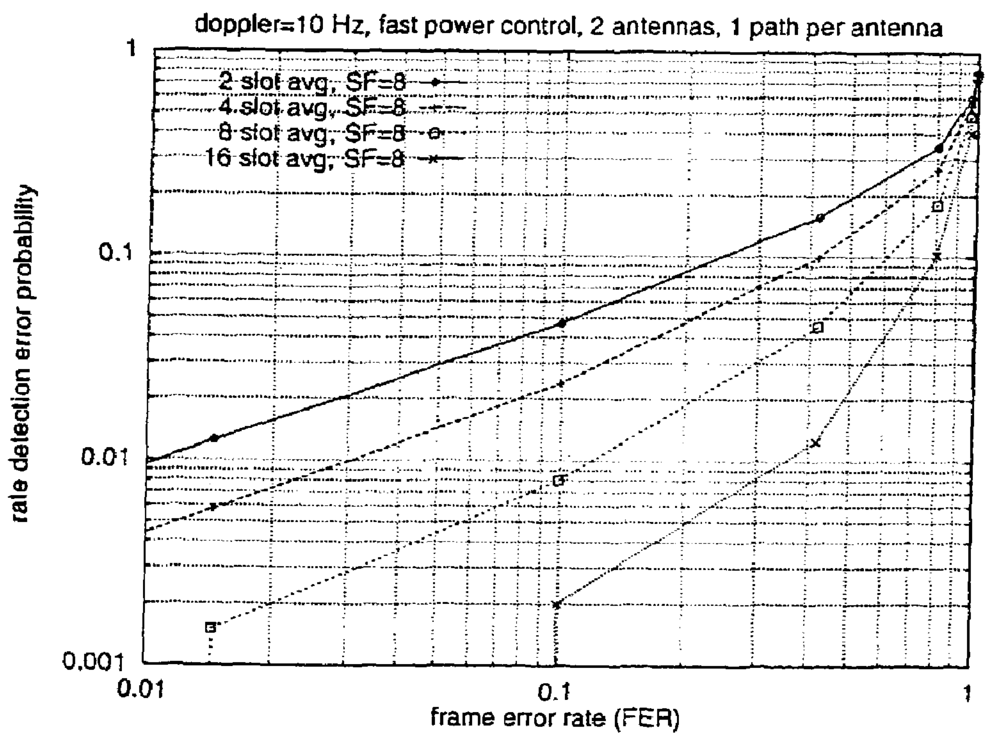
Figure 6E:
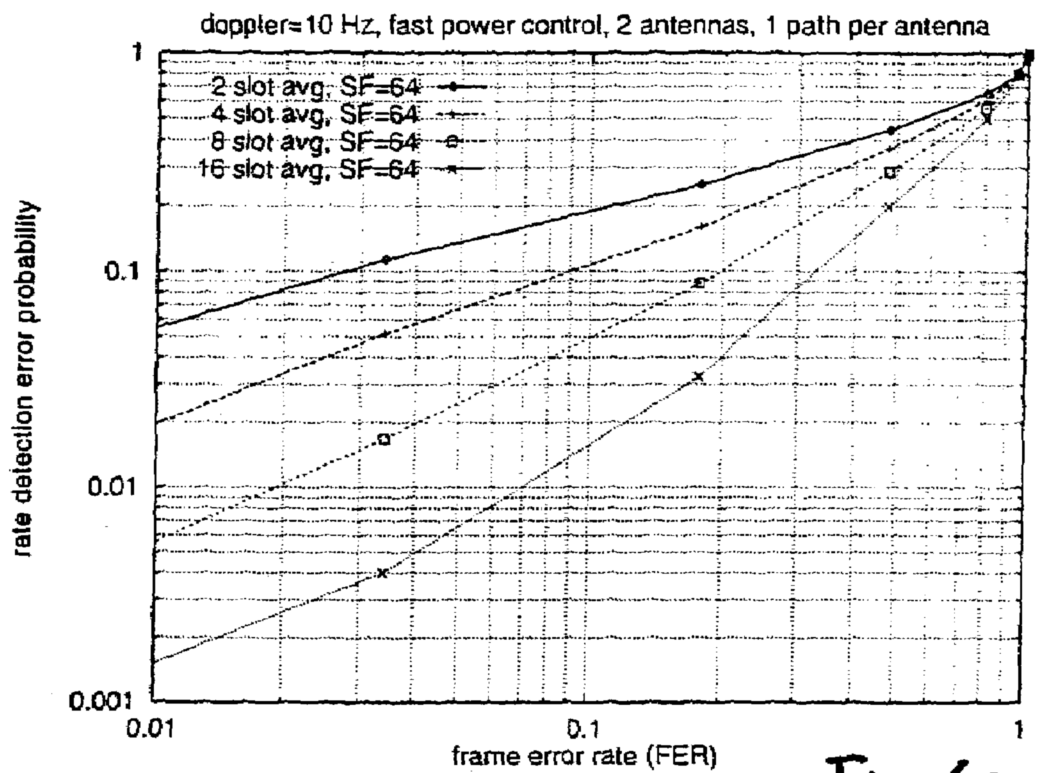
Figure 6F:
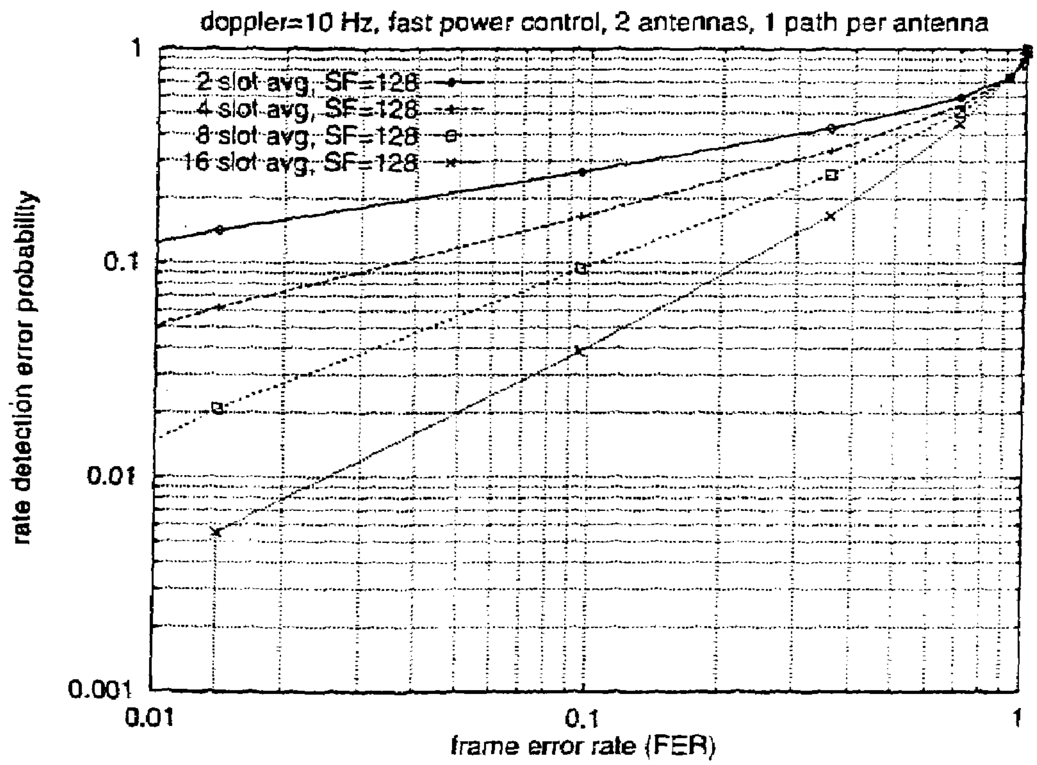
Figure 6G:
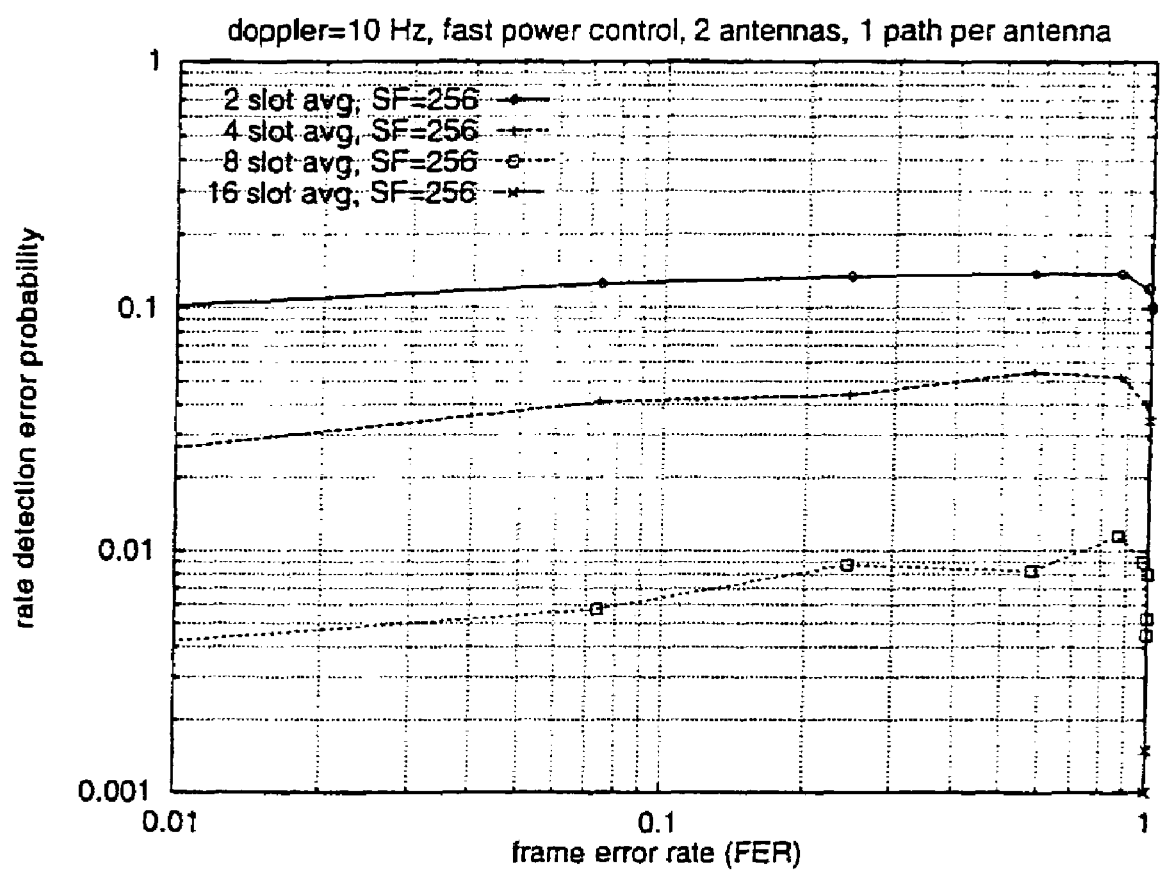
Figure 7A:
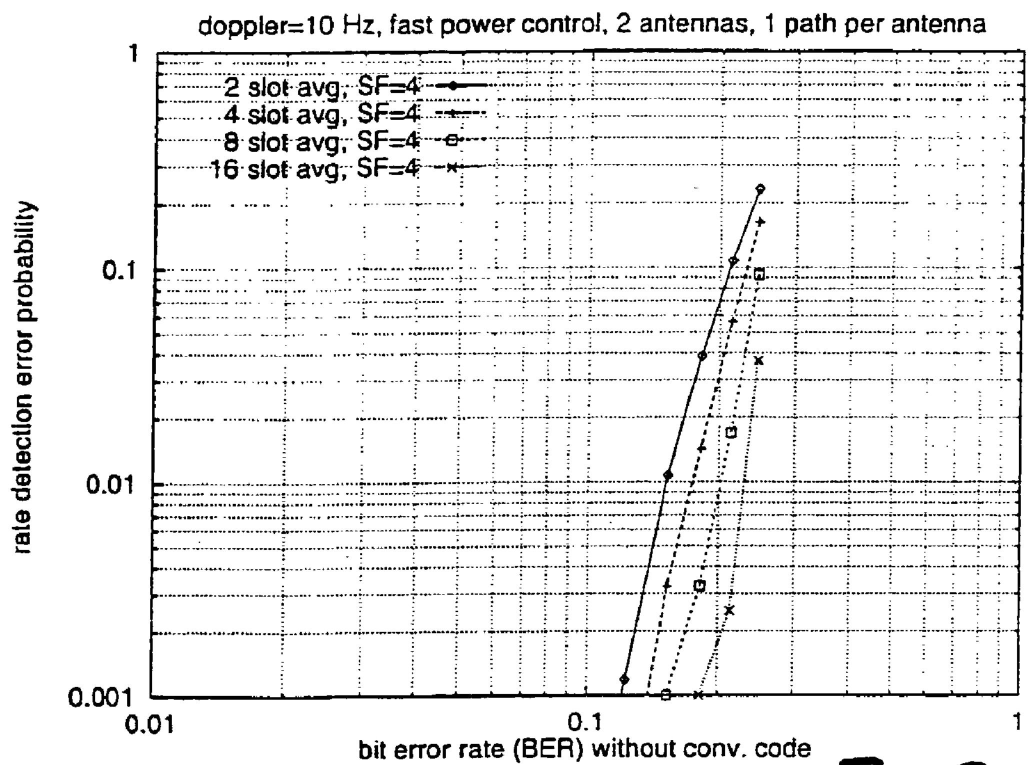
FIGS. 7*a* to 7*g* show simulation results obtained with different spreading factors as a probability of rate detection error relative to bit error rate.
Figure 7B:
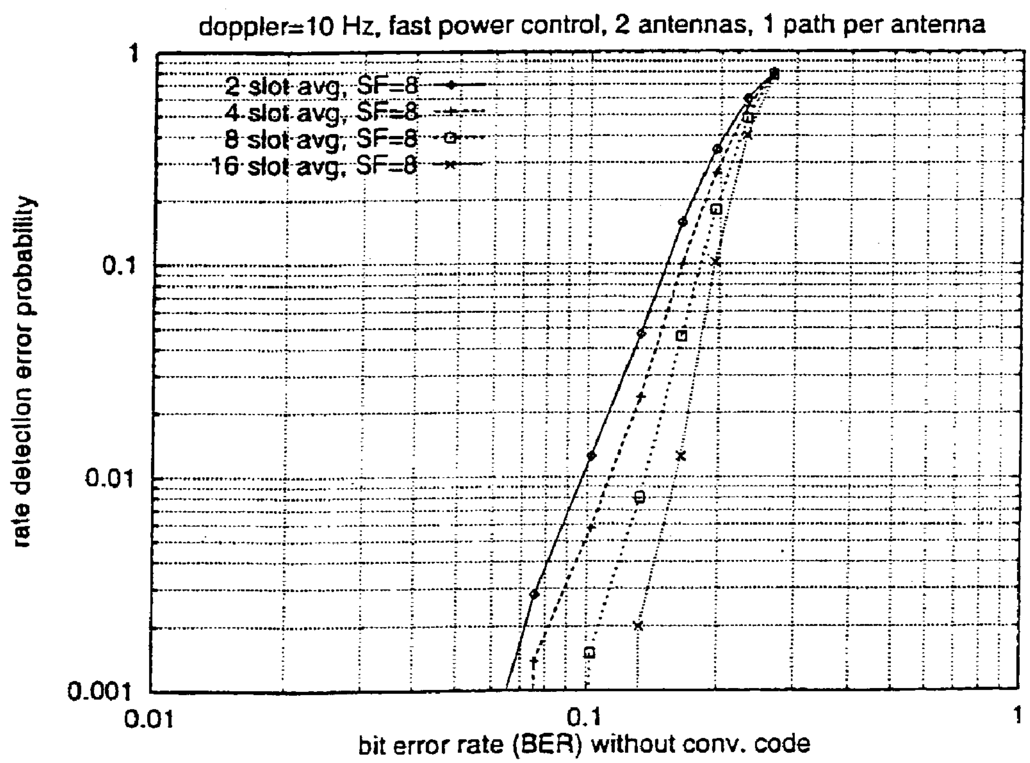
Figure 7C:
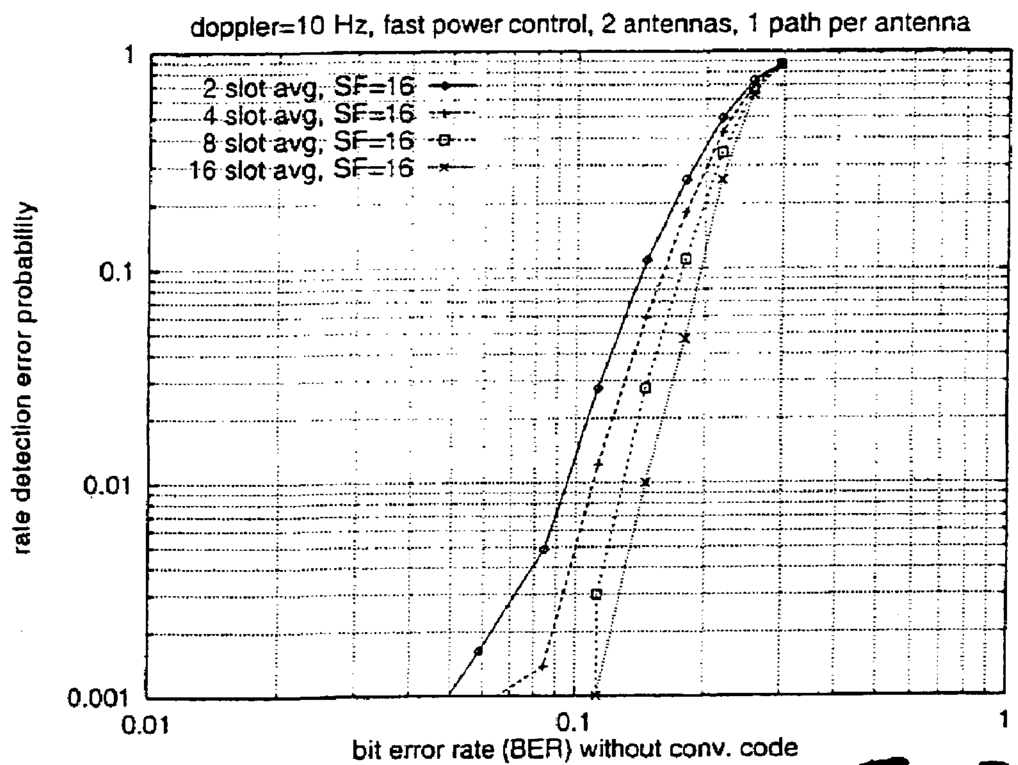
Figure 7D:
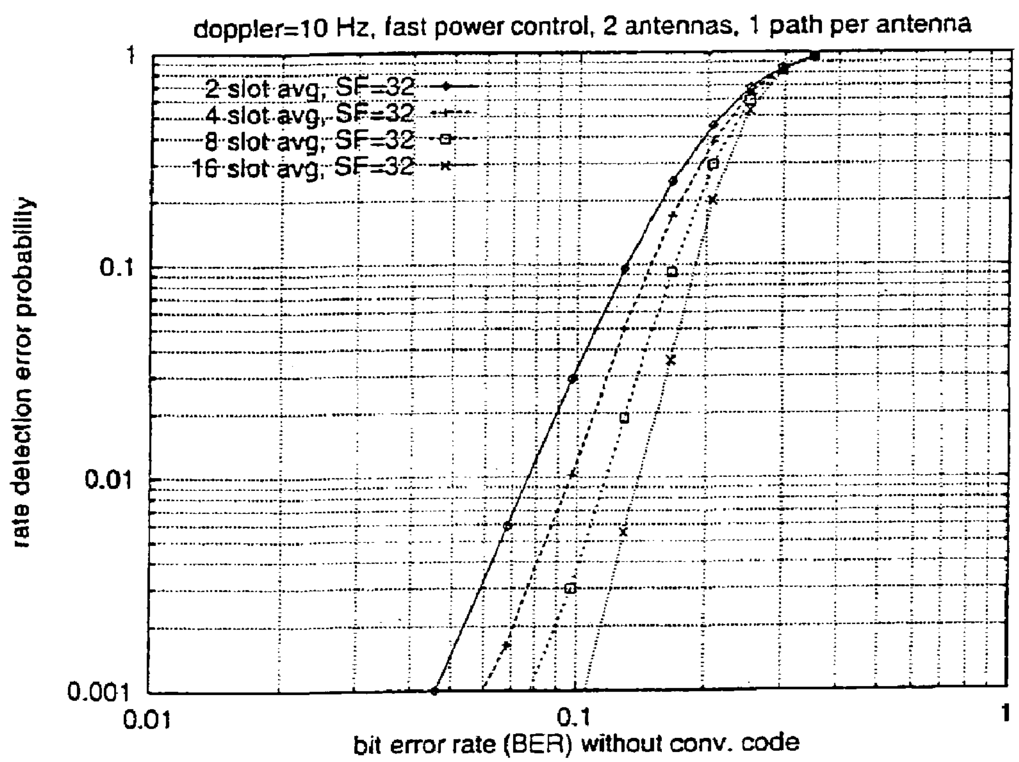
Figure 7E:
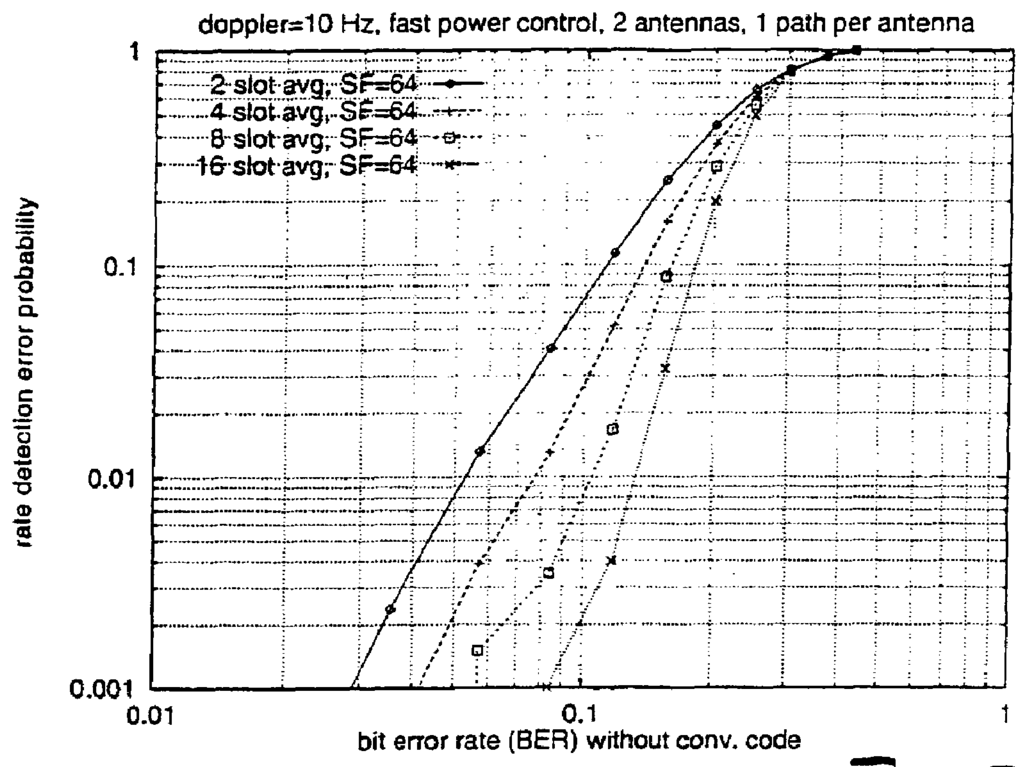
Figure 7F:
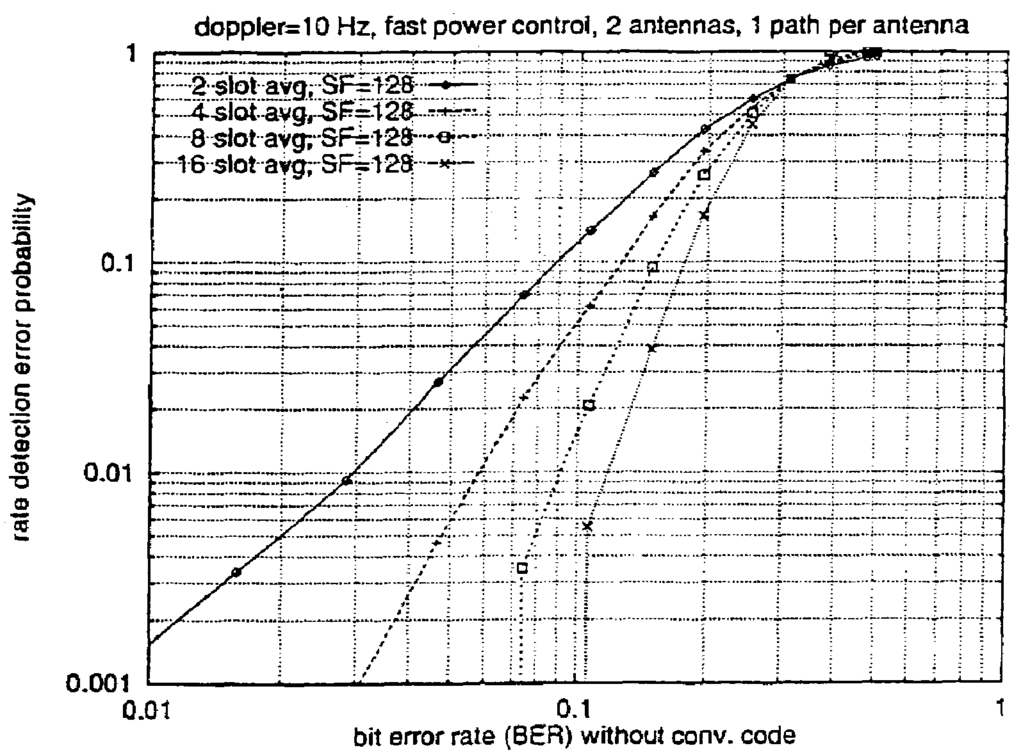
Figure 7G:
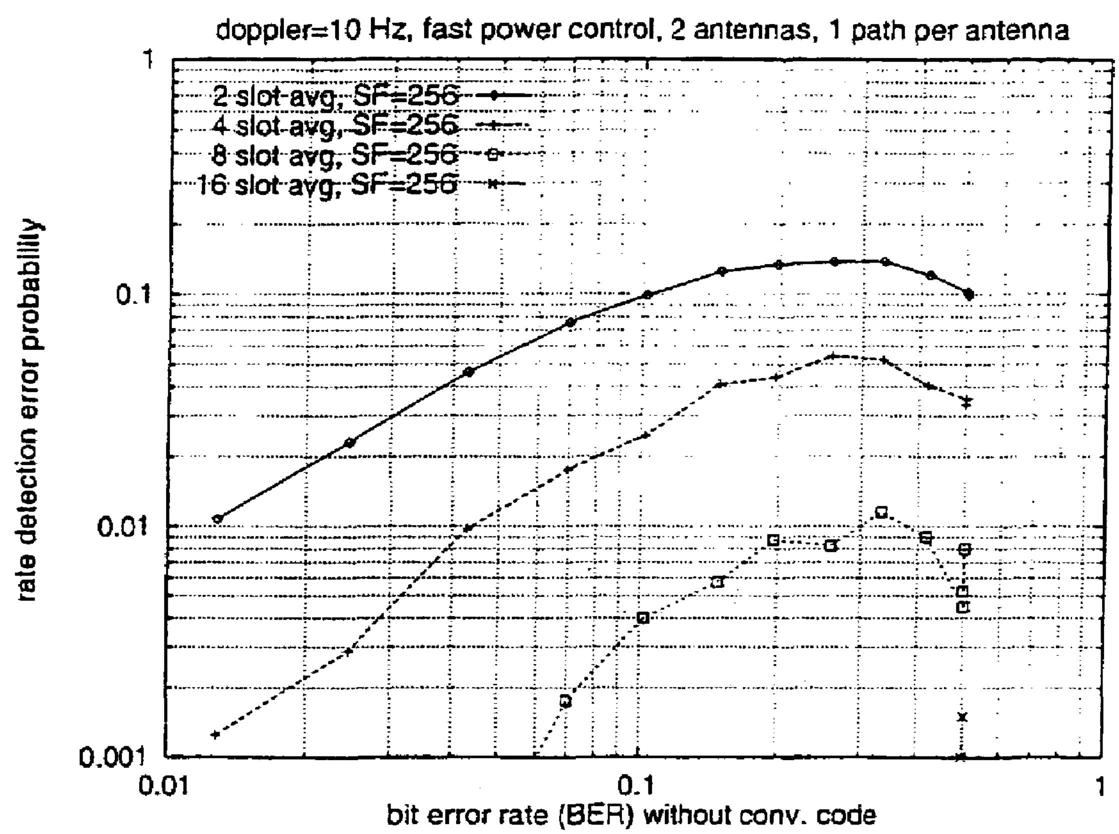

It can be noted from FIGS. 6*g* and 7*g* that the behavior for SF=256 is exceptional form the results obtained for the other spreading factors. This is because 256 is the largest considered spreading factor value and the employed rate detection method assumed the largest spreading factor (i.e. SF=256) as a default when the signal-to-noise ratio appeared to be very poor. Because of this, the weakest performance is seen in the case of SF=128 (FIGS. 6f and 7f) instead of SF=256.

It was found that data rates for SF=4, 8, 16 (FIGS. 6a to 6c and 7a to 7c) can be estimated with good accuracy with averaging over 2 time slots. At FER=0.1 rate detection error probability was found to be less than 0.1 for every spreading factor if the averaging is performed over 8 time slots.

Therefore it was concluded that the proposed embodiments give a simple and promising solution to the blind data rate detection. Knowledge of the signal amplitude, noise variance or signal-to-noise ratio is not needed, as the embodiments may use only soft bit samples obtained for the smallest possible data spreading factor. The above discussed simulations indicate that reliable date rate estimates are also provided in the case of a fading channel with fast transmission power control (TPC).

Although the invention has been described in the context of a CDMA based system, it will be appreciated that similar principles can be applied in other communication systems, for example in a TDMA system or in any telecommunications device receiving data symbols at variable rates and requiring information of the spreading factor or the data transmission rate, such as in modems.

While the invention has been described above in connection with the blind data rate detection, the described data rate estimation method could be used together with rate information bits or similar data rate information in order to produce verified and/or corrected data rate estimate. This is a viable alternative especially in implementations having high requirements for the accuracy of the transmission rate estimation.

It is also noted herein that while the above describes exemplifying embodiments of the invention, there are several variations and modifications which may be made to the disclosed solution without departing from the scope of the present invention as defined in the appended claims.

What is claimed is:

1. A method in a communication system with variable data transmission rates, wherein a transmitted signal includes a plurality of data symbols in one or several data frames, the plurality of data symbols being spread in each data frame in a manner defined by a respective spreading factor, comprising:

receiving the signal;

estimating noise variances for possible spreading factors that are for a data frame in the signal based on information that is determined by assuming that a smallest possible spreading factor was used for the transmission of the data frame;

scaling the estimated noise variances by predefined constants, each of the predefined constants depending on the possible respective spreading factor;

determining which one of the scaled noise variance estimates has a smallest value; and estimating a most probable spreading factor of a received data frame based on the determined smallest scaled noise variance estimate.

2. The method of claim 1, wherein the information is determined by processing soft data bit samples computed for the smallest possible spreading factor.

3. The method of claim 1, wherein the noise variance estimates for each of possible value are averaged over a predefined number of successive time slots, and the smallest value is the smallest value of scaled averages of the noise variance estimates.

4. The method of claim 1, further comprising:

estimating the data rate of the data frame based on the estimated spreading factor.

5. The method of claim 1, wherein a constant for scaling the respective spreading factor is defined in accordance with the relationship:

$$\alpha^{1/K},$$

wherein $\alpha$ is a predefined constant and K is an integer defining a length of the respective spreading factor as a multiple of the length of the smallest possible spreading factor.

6. The method of claim 5, wherein the term $\alpha$ equals approximately 2.8.

7. The method of claim 1, wherein the communication system comprises a cellular code division multiple access communications network, and the data is transmitted between a mobile station and a base station of the network over a radio interface.

8. A method for channel data transmission rate estimation in a cellular code division multiple access communication system wherein the data transmission rate is estimated in accordance with claim 1.

9. The method of claim 8, wherein the estimate of the data transmission rate is used to assist in rate selection for Viterbi decoding of received data symbols.

10. The method of claim 8, wherein the channel data transmission rate estimation is based both on the data rate information received from a transmitting station and the estimated data transmission rate.

11. Signal receiving circuitry for use in a communication system with variable data transmission rates, wherein data is transmitted as a plurality of data symbols spread over one or several data frames, the spreading of the plurality of data symbols within each of the data frames being defined by a respective spreading factor, the signal receiving circuitry comprising:

processor means for estimating noise variances for possible data spreading factors for a data frame;

wherein the estimate is based on information of a signal that is determined by assuming that a spreading factor used for transmission of a data frame is a smallest possible spreading factor for the transmission of the data frame, for scaling the estimated noise variances by predefined constants, each of the constants depending on a possible respective spreading factor, for determining which one of the scaled variance estimates that has the smallest value, and for estimating the most probable spreading factor of the received data frame based on the determination of the smallest scaled variance estimate.

12. The signal receiving circuitry of claim 11, wherein said processor means comprise a digital signal processor.

13. The signal receiving circuitry of claim 11, wherein said processor means comprise an application specific integrated circuit.

14. The signal receiving circuitry of claim 11, wherein said processor means are configured to determine said information of said signal by processing soft data bit samples computed for the smallest possible spreading factor.

15. A receiver station of a cellular radio communications system including said signal receiving circuitry of claim 11.

16. The method of claim 2, wherein the noise variance estimates for each of the possible values are averaged over a predefined number of successive time slots, and the smallest value is the smallest value of scaled averages of the noise variance estimates.

17. The method of claim 2, further comprising estimating the data rate of the data frame based on the estimated spreading factor.

18. The method of claim 3, further comprising estimating the data rate of the data frame based on the estimated spreading factor.

19. The method of claim 2, wherein the constant for scaling the respective spreading factor is defined in accordance with the relationship:

$\alpha^{1/K}$, wherein $\alpha$ is a predefined constant and K is an integer defining a length of the respective spreading factor as a multiple of the length of the smallest possible spreading factor.

20. The method of claim 3, wherein the constant for scaling the respective spreading factor is defined in accordance with the relationship:

$\alpha^{1/K}$, wherein $\alpha$ is a predefined constant and K is an integer defining a length of the respective spreading factor as a multiple of the length of the smallest possible spreading factor.

21. The method of claim 4, wherein the constant for scaling the respective spreading factor is defined in accordance with the relationship:

$\alpha^{1/K}$, wherein $\alpha$ is a predefined constant and K is an integer defining a length of the respective spreading factor as a multiple of the length of the smallest possible spreading factor.

22. The method of claim 2, wherein the communication system comprises a cellular code division multiple access communications network, and the data is transmitted between a mobile station and a base station of the network over a radio interface.

23. The method of claim 3, wherein the communication system comprises a cellular code division multiple access communications network, and the data is transmitted between a mobile station and a base station of the network over a radio interface.

24. The method of claim 4, wherein the communication system comprises a cellular code division multiple access communications network, and the data is transmitted between a mobile station and a base station of the network over a radio interface.

25. The method of claim 5, wherein the communication system comprises a cellular code division multiple access communications network, and the data is transmitted between a mobile station and a base station of the network over a radio interface.

26. The method of claim 6, wherein the communication system comprises a cellular code division multiple access communications network, and the data is transmitted between a mobile station and a base station of the network over a radio interface.

27. A method for channel data transmission rate estimation in a cellular code division multiple access communication system wherein the data transmission rate is estimated in accordance with claim 2.

28. A method for channel data transmission rate estimation in a cellular code division multiple access communication system wherein the data transmission rate is estimated in accordance with claim 3.

29. A method for channel data transmission rate estimation in a cellular code division multiple access communication system wherein the data transmission rate is estimated in accordance with claim 4.

30. A method for channel data transmission rate estimation in a cellular code division multiple access communication system wherein the data transmission rate is estimated in accordance with claim 5.

31. A method for channel data transmission rate estimation in a cellular code division multiple access communication system wherein the data transmission rate is estimated in accordance with claim 6.

32. A method for channel data transmission rate estimation in a cellular code division multiple access communication system wherein the data transmission rate is estimated in accordance with claim 7.

33. The method of claim 9, wherein the channel estimation is based both on a data rate information received from a transmitting station and the estimated data transmission rate.

34. The signal receiving circuitry of claim 12, wherein said processor means are arranged to determine said information of said signal by processing soft data bit samples computed for the smallest possible spreading factor.

35. The signal receiving circuitry of claim 13, wherein said processor means are arranged to determine said information of said signal by processing soft data bit samples computed for the smallest possible spreading factor.

36. A receiver station of a cellular radio communications system including said signal receiving circuitry of claim 12.

37. A receiver station of a cellular radio communications system including said signal receiving circuitry of claim 13.

38. A receiver station of a cellular radio communications system including said signal receiving circuitry of claim 14.

* * * * *